United States Patent
Kokubo et al.

(10) Patent No.: US 7,920,181 B2
(45) Date of Patent: Apr. 5, 2011

(54) SEMICONDUCTOR INTEGRATED APPARATUS AND BLACK LEVEL CORRECTION METHOD FOR IMAGE SENSOR

(75) Inventors: Asao Kokubo, Kawasaki (JP); Hiroshi Daiku, Kawasaki (JP); Jun Funakoshi, Kawasaki (JP); Tsuyoshi Higuchi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1415 days.

(21) Appl. No.: 11/360,673

(22) Filed: Feb. 24, 2006

(65) Prior Publication Data
US 2007/0075772 A1 Apr. 5, 2007

(30) Foreign Application Priority Data
Sep. 30, 2005 (JP) ................................. 2005-288744

(51) Int. Cl.
*H04N 5/217* (2006.01)
(52) U.S. Cl. ......... 348/241; 348/243; 348/246; 348/247
(58) Field of Classification Search ............... 348/222.1, 348/229.1, 241, 243, 246, 247, 379, 691, 348/673, 687, 712
See application file for complete search history.

(56) References Cited

U.S. PATENT DOCUMENTS
6,518,998 B1 * 2/2003 Christoff et al. ........... 348/216.1

FOREIGN PATENT DOCUMENTS
| JP | 2000-244843 A | 9/2000 |
| JP | 2002-281343 A | 9/2002 |
| JP | 2003-110943 A | 4/2003 |
| JP | 2003-209713 A | 7/2003 |
| JP | 2004-007068 A | 1/2004 |

* cited by examiner

*Primary Examiner* — Yogesh K Aggarwal
(74) *Attorney, Agent, or Firm* — Fujitsu Patent Center

(57) ABSTRACT

The challenge of the present invention is to suppress a variation in brightness of an image and make a reference value of a black level converge at an appropriate value in a short time. A condition judgment circuit judges whether or not a frame of an amount of change in gains of a variable gain amplifier being equal to or greater than a threshold continues for a predefined frames or more. If a frame of an amount of change in the gains being equal to or greater than the threshold continues for the predefined frames, a black level value of the current frame is set for new black level reference. If not continues for the predetermined number, the previous black level reference value is retained in lieu of correcting the black level.

3 Claims, 15 Drawing Sheets

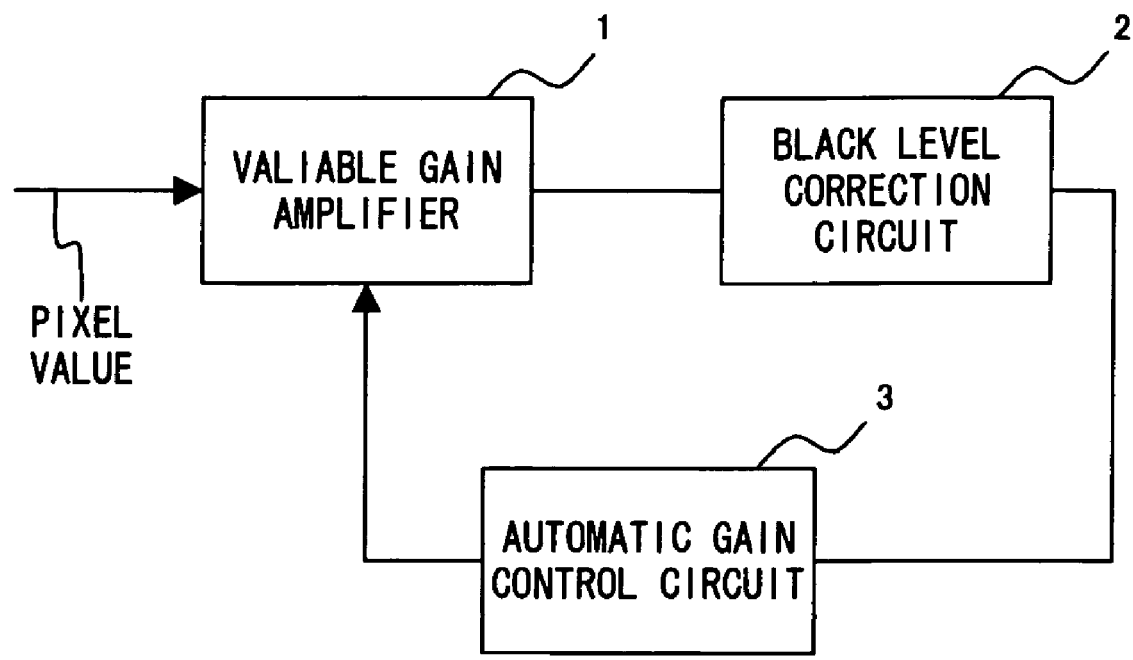
F I G. 6

THRESHOLD VALUE = 6

| | GAIN a | GAIN b | GAIN c | GAIN d | JUDGEMENT RESULT (1 FRAME JUDGED) | JUDGEMENT RESULT (2 FRAMES JUDGED) | JUDGEMENT RESULT (3 FRAMES JUDGED) |
|---|---|---|---|---|---|---|---|
| (1) | 0 | 0 | 0 | 0 | CONDITION 2 | CONDITION 2 | CONDITION 2 |
| | 0 | 0 | 0 | 0 | CONDITION 2 | CONDITION 2 | CONDITION 2 |
| (2) | 0 | 0 | 0 | 0 | CONDITION 2 | CONDITION 2 | CONDITION 2 |
| | 11 | 0 | 0 | 0 | CONDITION 1 | CONDITION 3 | CONDITION 3 |
| (3) | 12 | 11 | 0 | 0 | CONDITION 2 | CONDITION 1 | CONDITION 3 |
| | 13 | 12 | 11 | 0 | CONDITION 2 | CONDITION 2 | CONDITION 1 |
| | 0 | 13 | 12 | 11 | CONDITION 1 | CONDITION 3 | CONDITION 3 |
| | 0 | 0 | 13 | 12 | CONDITION 2 | CONDITION 1 | CONDITION 3 |
| | 0 | 0 | 0 | 13 | CONDITION 2 | CONDITION 2 | CONDITION 1 |
| | 0 | 0 | 0 | 0 | CONDITION 2 | CONDITION 2 | CONDITION 2 |
| | 11 | 0 | 0 | 0 | CONDITION 1 | CONDITION 3 | CONDITION 3 |
| | 0 | 11 | 0 | 0 | CONDITION 1 | CONDITION 2 | CONDITION 2 |
| | 0 | 0 | 11 | 0 | CONDITION 2 | CONDITION 2 | CONDITION 2 |
| | 0 | 0 | 0 | 11 | CONDITION 2 | CONDITION 2 | CONDITION 2 |

FIG. 12

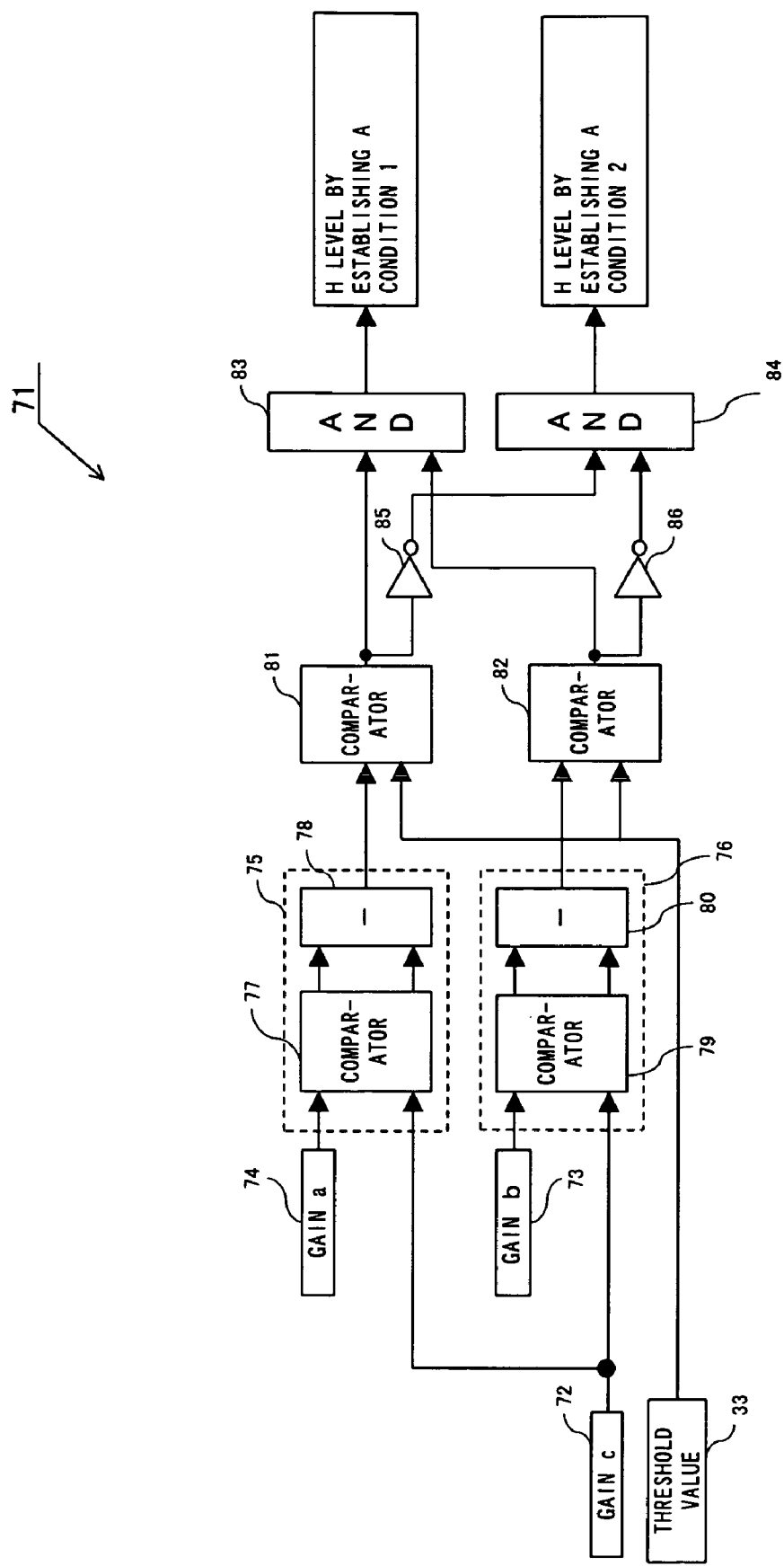
F I G. 1 3

SEMICONDUCTOR INTEGRATED APPARATUS AND BLACK LEVEL CORRECTION METHOD FOR IMAGE SENSOR

CROSS REFERENCE TO RELATED APPLICATIONS

This application is based upon and claims the benefit of priority from the prior Japanese Patent Application No. 2005-288744 filed on Sep. 30, 2005, the entire contents of which are incorporated herein by reference.

BACKGROUND OF THE INVENTION

1. Field of the Invention

The present invention relates to a semiconductor integrated apparatus having a black level correction circuit for an image sensor and a black level correction method therefor.

2. Description of the Related Art

A semiconductor image sensor such as a CMOS (complementary metal-oxide semiconductor) sensor changes an output level thereof due to a temperature change, et cetera, resulting in an imaged image becoming lighter or darker due to a temperature change even if the same imaging object is imaged. In order to eliminate such a problem, a fluctuation of an output of an image sensor due to a temperature change, et cetera, is suppressed by shading a part thereof from light and subtracting an pixel value of the part shaded from light from that of the part exposed thereto of the image sensor.

FIG. 1 shows a configuration of a conventional image sensor and a circuit for correcting a black level of a pixel of the image sensor.

The image sensor 11 comprises the n by n number of pixels, lets a part 11a thereof shaded from light (simply "shaded part 11a" hereinafter), and constitutes an imaging-use sensor by the other part (called "imaging part" hereinafter) 11b. The pixels of a shaded part 11a are used for figuring out the reference value for a black level at a black level correction circuit 13 described later.

Shift registers 14 and 15 are circuits for addressing a line and a column of the image sensor 11 and pixel values of the lines and columns addressed by the shift registers 14 and 15 are transmitted in sequence to be output to A/D (analog to digital) converters 12a and 12b.

A black level correction circuit 13 figures out an average of black level pixel values for one line output from the shaded part 11a of the image sensor 11 as a black level reference value, and outputs, to an automatic gain control (AGC) circuit 16 and a color processing block 17, the difference between the pixels value output from the imaging part 11b and the black level reference value.

The automatic gain control circuit 16 outputs a gain control signal for controlling a gain of a variable gain amplifier (not shown herein) at the front stages of the A/D converters 12a and 12b to a timing generator (TG) 18.

The timing generator 18 outputs a timing signal A at the high level for a predetermined time period to make the shaded part 11a output the pixels value of a black level as shown by FIG. 2. Then, after the predetermined time, it outputs a timing signal B at the high level for reading pixel values for one line out of the imaging part 11b and outputting invalid data for a predefined time period. The black level correction circuit 13 sequentially outputs a post-correction value of valid pixels for one line synchronously with a timing signal C.

FIGS. 3, 4 and 5 show an A/D converted output code of a black level pixel value output from the shaded part 11a, that (at a pre-correction black level) of a value of valid pixels of the imaging part 11b after A/D converting and an output code of a post-correction valid pixel of a black level, which are all shown by a frame, in the case of imaging the same image by the image sensor 11.

In each of the drawings, the vertical axis of the drawing shows values of the output code, while the horizontal axis shows the frame numbers.

FIG. 3 shows the case of a black level output code (that is shown by diamond shaped dots in FIG. 3) of the shaded part 11a being approximately the same as an output code of a valid pixel (that is shown by square dots in FIG. 3) of the imaging part 11b by the unit of frame.

In this case, a post-correction output code of valid pixel (that is shown by triangle dots in FIG. 3), which is obtained by subtracting the black level output code from the pre-correction output code of a valid pixel, shows hardly a difference between frames, and therefore there is hardly a difference in brightness between the frames.

FIG. 4 shows output codes of a black level and valid pixel in the case of a change in an output code of the shaded part 11a and that in an output code of the imaging part 11b fluctuating in the unit of frame.

In this case, a post-correction output code of valid pixel, which is obtained by subtracting the black level output code from the pre-correction output code of a valid pixel, fluctuates in great deal by the unit of frame and therefore there is a large difference in brightness between frames.

FIG. 5 exemplifies a case of controlling a gain of the variable gain amplifier for amplifying an output of the image sensor 11.

In this case, an output code (a valid pixel after a black level correction), which is obtained by subtracting the black level output code from the pre-correction output code of a valid pixel, fluctuates in great deal by the unit of frame and therefore there is a large difference in brightness between the frames.

As a method for calculating a black level reference value, for example a patent document 1 notes a method for updating the black level reference data from the average of the current one line black level, or the average of black level of one frame, and the black level reference data of the previous time, in order to prevent a drastic change in the black level.

Meanwhile, a patent document 2 notes a method for removing an influence of a dark current changing over time by detecting the dark current at a predetermined time interval for correcting a screen image signal in an imaging apparatus which uses a CMOS imaging device.

Incidentally, in the case of a variable gain amplifier amplifying the pixels value detected by an image sensor, a change in gains changes a black level value amplified by the variable gain amplifier, resulting in automatically updating a black level reference value.

However, in the case of calculating a black level reference value from the average brightness of a plurality of the previous frames, a change in black level value output from the variable gain amplifier causes a gradual change in the black level reference value. This brings forth a problem of the black level reference value taking time for converging on a appropriate value.

[Patent document 1] laid-open Japanese patent application publication No. 2002-281343

[Patent document 2] laid-open Japanese patent application publication No. 2004-7068

SUMMARY OF THE INVENTION

The challenge of the present invention is to suppress a variation in brightness of an image and make a reference value of a black level converge at an appropriate value in a short time.

A semiconductor integrated apparatus according to the present invention comprises a variable gain amplifier for amplifying the pixels value detected by an image sensor; a black level correction circuit for judging whether or not a period of an amount of change in gains of the variable gain amplifier being equal to or greater than a predetermined value continues for a predefined period or more, making a black level value of the image sensor which is output from the variable gain amplifier as new black level reference value if a period of an amount of change in gains of the variable gain amplifier being equal to or greater than a predetermined value continues for a predefined period or more, and correcting a black level of a valid pixel of the image sensor based on the black level reference value, or correcting a black level of the valid pixel based on the previous black level reference value in lieu of updating it if a period of an amount of change in gains of the variable gain amplifier being equal to or greater than a predetermined value does not continue for a predefined period or more; and an automatic gain control circuit for controlling a gain of the variable gain amplifier based on a value of a valid pixel which is corrected for a black level by the black level correction circuit.

The present invention makes it possible to suppress a variation in brightness of an image by an image sensor and also make a reference value of a black level converge at an appropriate value in a short time.

Another semiconductor integrated apparatus according to the present invention comprises: a variable gain amplifier for amplifying the pixels value detected by an image sensor; a black level correction circuit for judging whether or not a period of an amount of change in gains of the variable gain amplifier being equal to or greater than a predetermined value continues for a predefined period or more, making a black level value of the image sensor which is output from the variable gain amplifier as new black level reference value if a period of an amount of change in gains of the variable gain amplifier being equal to or greater than a predetermined value continues for a predefined period or more, and correcting a black level of a valid pixel of the image sensor based on the black level reference value; or making a calculated value based on the current black level value and a black level reference value as new black level reference value, and correcting a black level of the valid pixel based on the black level reference value; and an automatic gain control circuit for controlling a gain of the variable gain amplifier based on a value of a valid pixel corrected for a black level by the black level correction circuit.

The present invention makes it possible to suppress a variation in brightness of an image of an image sensor and also make a reference value of a black level converge at an appropriate value in a short time.

In the semiconductor integrated apparatus according to the present invention, the black level correction circuit makes a black level value which is output from the variable gain amplifier as new black level reference value if a frame of an amount of change in gains being equal to or greater than a predetermined value continues for a predefined number of frames or more, makes a calculated value based on a black level value and the black level reference value as new black level reference value if an amount of changes is less than a predetermined value, and retains the previous black level reference value in lieu of updating it if a frame of an amount of change in gains being equal to or greater than a predetermined value does not continue for a predefined number of frames or more.

This configuration keeps a black level reference value from being updated if a change in gains does not continue for a predefined number of frames or more, thereby enabling a suppression of a variation of brightness by the unit of frame.

In the semiconductor integrated apparatus according to the present invention, the black level correction circuit comprises a gain storage circuit for storing gains of the variable gain amplifier relating to plural frames of images detected by the image sensor, a judgment circuit for calculating amounts of changes in gains of other frames vis-à-vis a gain of a specific frame which is stored by the gain storage circuit and judging whether or not a frame of the amount of change in a gain being equal to or greater than a predetermined value continues for a predefined number of frames or more, and a selection circuit for selecting a black level value output from the variable gain amplifier as new black level reference value if the judgment circuit judges that a frame of an amount of change in gains being equal to or greater than a predetermined value continues for a predefined number of frames or more, or selecting the previous black level reference value in lieu of updating it if the judgment circuit judges that a frame of an amount of change in gains being equal to or greater than a predetermined value does not continue for a predefined number of frames or more.

Such a configuration enables a convergence of a black level reference value at a targeted value in a short time by setting up a black level value of the current frame as the black level reference value if a frame of an amount of change in gains equaling to or greater than a predetermined value continues a predefined number of frames. Furthermore, if a change in gains does not continue for a predefined period, a black level is not updated, thus preventing a brightness of an image from fluctuating by the unit of frame otherwise by the black level reference value being updated due to an instantaneous change of brightness of a photographing subject.

In the semiconductor integrated apparatus according to the present invention, the black level correction circuit comprises a gain storage circuit for storing gains of the variable gain amplifier relating to plural frames of images detected by the image sensor, a judgment circuit for calculating amounts of changes in gains of other frames vis-à-vis a gain of a specific frame which is stored by the gain storage circuit to judge whether or not a frame of the amount of changes in gains being equal to or greater than a predetermined value continues for a predefined number of frames or more, and a selection circuit for selecting a black level value output from the variable gain amplifier as new black level reference value if the judgment circuit judges that a frame of an amount of change in gains being equal to or greater than a predetermined value continues for a predefined number of frames or more, selecting a calculated value from a black level value output from the variable gain amplifier and a black level reference value as new black level reference value if the judgment circuit judges that a frame of an amount of change in gains being equal to or greater than a predetermined value does not exist, or selecting the previous black level reference value in lieu of updating it if the judgment circuit judges that an amount of change in gains is equal to or greater than a predetermined value and that a frame of an amount of change in gains being equal to or greater than a predetermined value does not continue for a predefined number of frames or more.

Such a configuration enables a convergence of a black level reference value on an appropriate value in a short time by calculating the black level reference value based on the current black level value if a change in a gain continues for a predetermined number of frames. And, if there is no change in gains, a calculation of new black level reference value from the current black level value and the black level reference value, thereby suppressing a rapid change of the black level reference value.

In the semiconductor integrated apparatus according to the present invention, the black level correction circuit at least comprises a first gain storage circuit for storing a gain of the variable gain amplifier of the current frame, a second gain storage circuit for storing a gain of a first previous frame, a third gain storage circuit for storing a gain of a second previous frame, a fourth gain storage circuit for storing a gain of a third previous frame, and a judgment circuit for calculating amounts of changes in gains of other frames vis-à-vis a specific frame stored by the first through fourth gain storage circuits and judging whether or not a frame of the amount of change in gains being equal to or greater than a predetermined value continues for a predefined number of frames.

Such a configuration enables a convergence of a black level reference value on an appropriate value in a short time by correcting a black level reference value to the current black level value if a frame of a change in gains being equal to or greater than a predetermined value for three frames or more for example. Meanwhile, a black level update is not carried out for less than three frames, thereby suppressing a variation of image brightness.

In the semiconductor integrated apparatus according to the present invention, the variable gain amplifier comprises a first variable gain amplifier for amplifying a black level value output from a shaded pixel, from light, of the image sensor, and a second variable gain amplifier for amplifying a value of a valid pixel of the image sensor; and the black level correction circuit at least comprises a gain storage circuit for storing gains of the first and second variable gain amplifiers relating to the current, a first previous frame, a second previous frame and a third previous frame, and a judgment circuit for calculating amounts of changes in gains of other frames vis-à-vis a specific frame stored by the gain storage circuit and judging whether or not a frame of the amount of change in gains being equal to or greater than a predetermined value continues for a predefined number of frames or more.

Such a configuration enables a setup of the current black level value as a black level reference value if an amount of change in gains becomes a predetermined value or greater for three consecutive frames, thereby enabling a convergence of a black level reference value on an appropriate value in a short time.

Another semiconductor integrated apparatus according to the present invention comprises a variable gain amplifier for amplifying the pixels value detected by an image sensor; and a black level correction circuit for calculating an amount of changes in black level values of a plurality of frames detected by the image sensor, judging whether or not a period in which an amount of changes in black level values is equal to or greater than a predetermined value continues for a predefined period or more, making a black level value which is output from the variable gain amplifier as new black level reference value and correcting a black level of a valid pixel of the image sensor based on the black level reference value if a period in which an amount of changes in black level values is equal to or greater than a predetermined value continues for a predefined period or more, or correcting a black level of the valid pixel based on the previous black level reference value in lieu of updating it if a period in which an amount of changes in black level values is equal to or greater than a predetermined value does not continue for a predefined period or more; and an automatic gain control circuit for controlling a gain of the variable gain amplifier based on a value of the valid pixel which is corrected for a black level and output from the black level correction circuit.

The present invention makes it possible to suppress a variation in brightness of an image by an image sensor and also make a reference value of a black level converge at an appropriate value in a short time.

BRIEF DESCRIPTION OF THE DRAWINGS

FIG. 6 shows a fundamental comprisal of the present invention;

FIG. 12 shows a gain and a judgment result;

FIG. 13 shows another example of a condition judgment circuit;

DESCRIPTION OF THE PREFERRED EMBODIMENTS

The following is a detailed description of the preferred embodiment of the present invention while referring to the accompanying drawings. FIG. 6 shows a fundamental comprisal of a semiconductor integrated apparatus according to the present embodiment.

The semiconductor integrated apparatus comprises a variable gain amplifier 1 for amplifying the pixels value detected by an image sensor; a black level correction circuit 2 for judging whether or not a period of an amount of change in gains of the variable gain amplifier 1 being equal to or greater than a predetermined value continues for a predefined period or more, making a black level value of the image sensor which is output from the variable gain amplifier 1 as new black level reference value if a period of an amount of change in gains of the variable gain amplifier 1 being equal to or greater than a predetermined value continues for a predefined period or more and correcting a black level of a valid pixel of the image sensor based on the black level reference value, or correcting a black level of the valid pixel based on the previous black level reference value in lieu of updating it if a period of an amount of changes in the gain being equal to or greater than a predetermined value does not continue for the predefined period or more; and an automatic gain control circuit 3 for controlling a gain of the variable gain amplifier based on a value of a valid pixel which is corrected for a black level by the black level correction circuit 2.

The present embodiment makes it possible to suppress a variation in brightness of an image by an image sensor and also make a reference value of a black level converge at an appropriate value in a short time.

Figure 7:
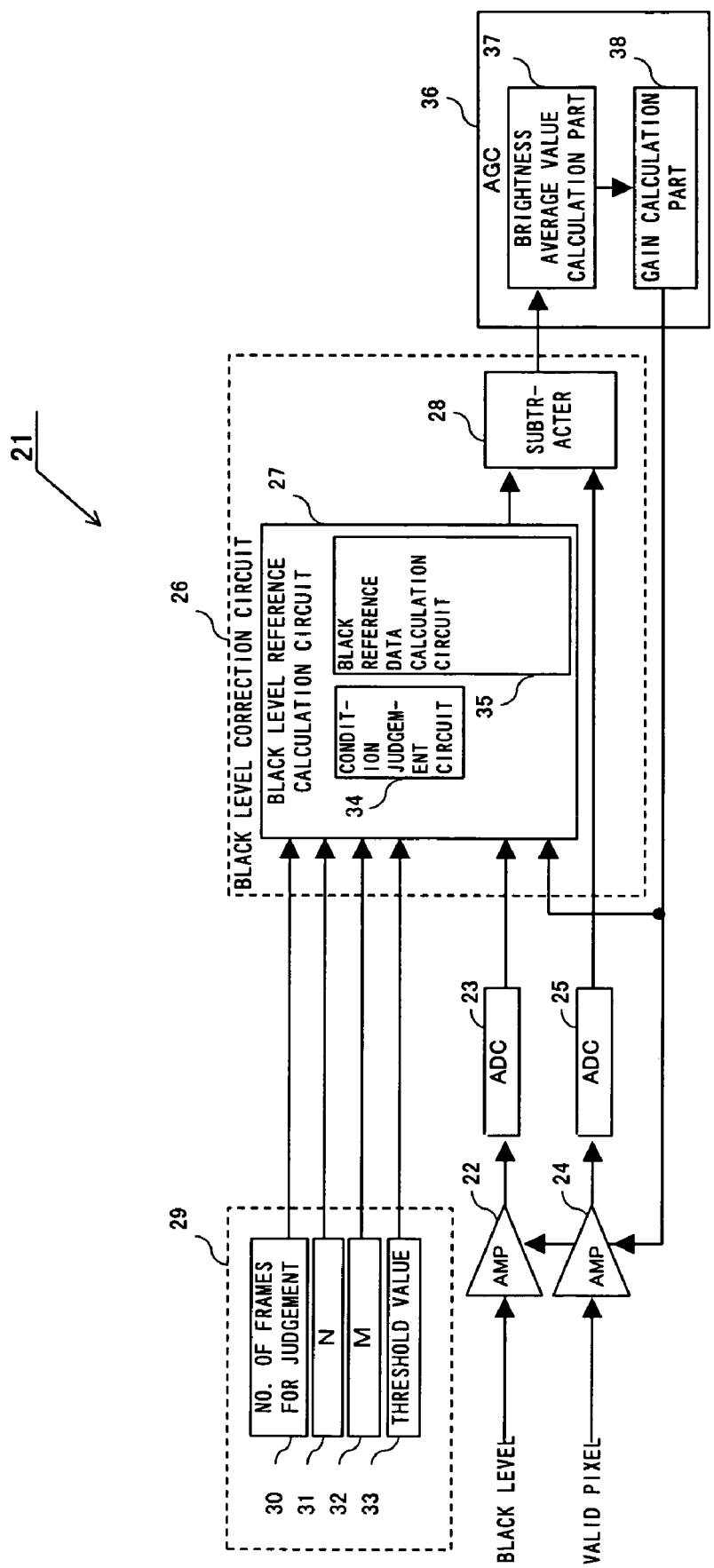
FIG. 7 is a circuit block diagram of a semiconductor integrated apparatus according to a first embodiment.

FIG. 7 is a circuit block diagram of a semiconductor integrated apparatus (i.e., a semiconductor integrated circuit) 21 including a black level correction circuit according to a first embodiment.

Figure 1:
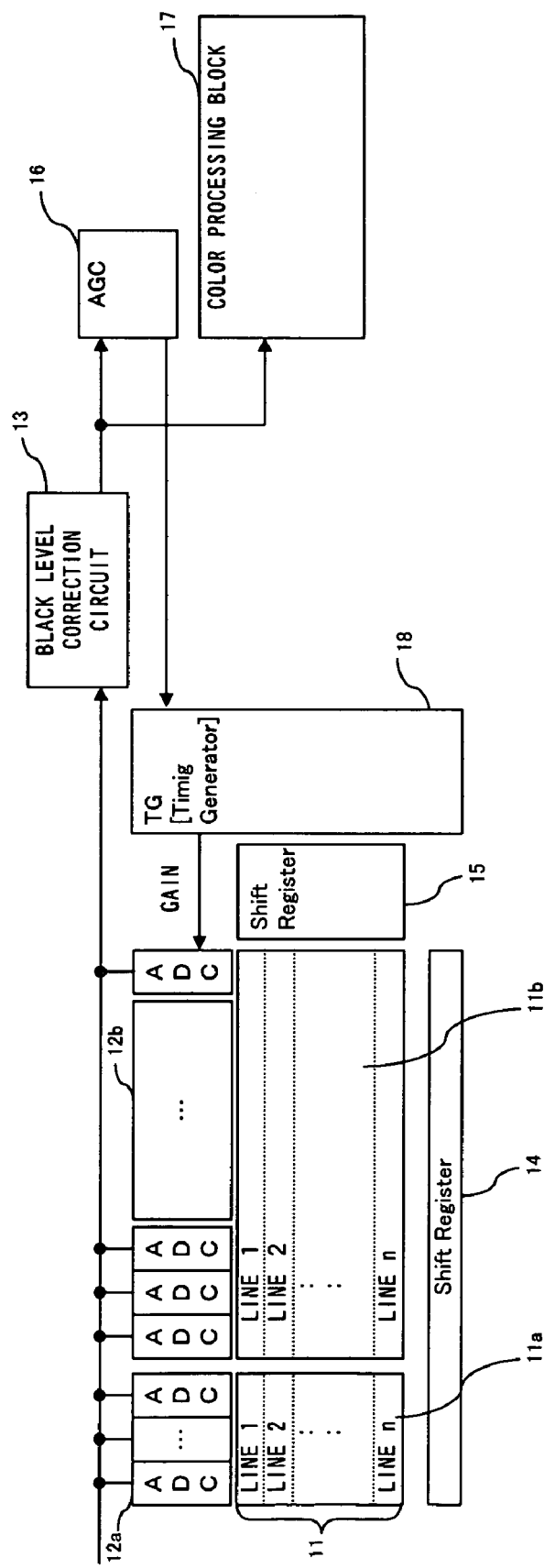
FIG. 1 shows a conventional image sensor and black level correction circuit.
Figure 2:
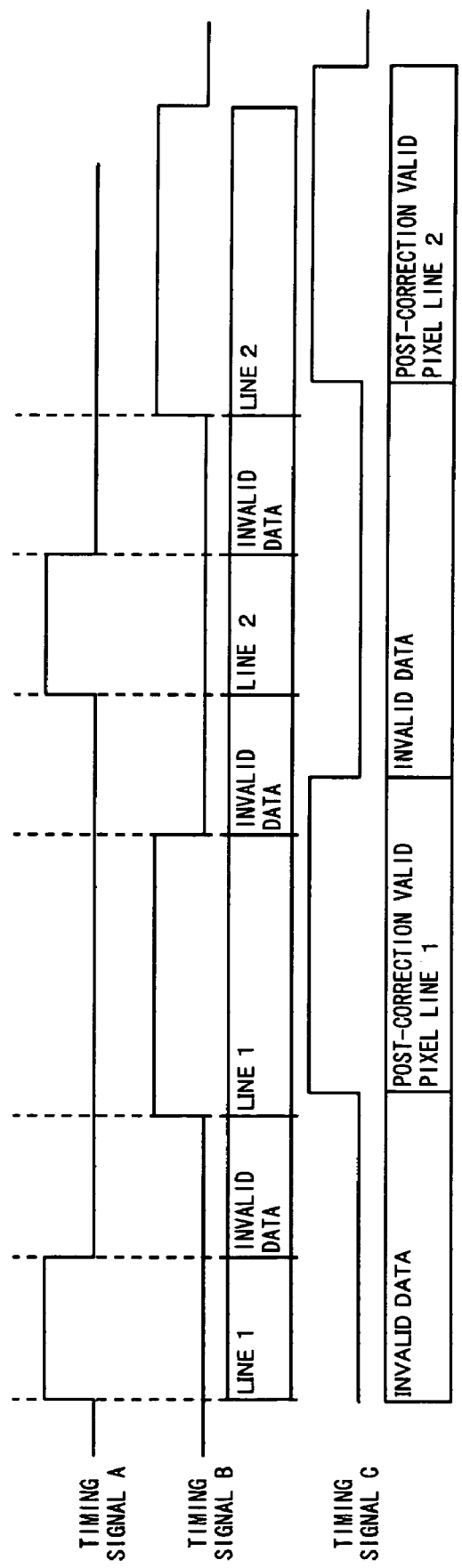
FIG. 2 is a timing chart of a circuit.
Figure 3:
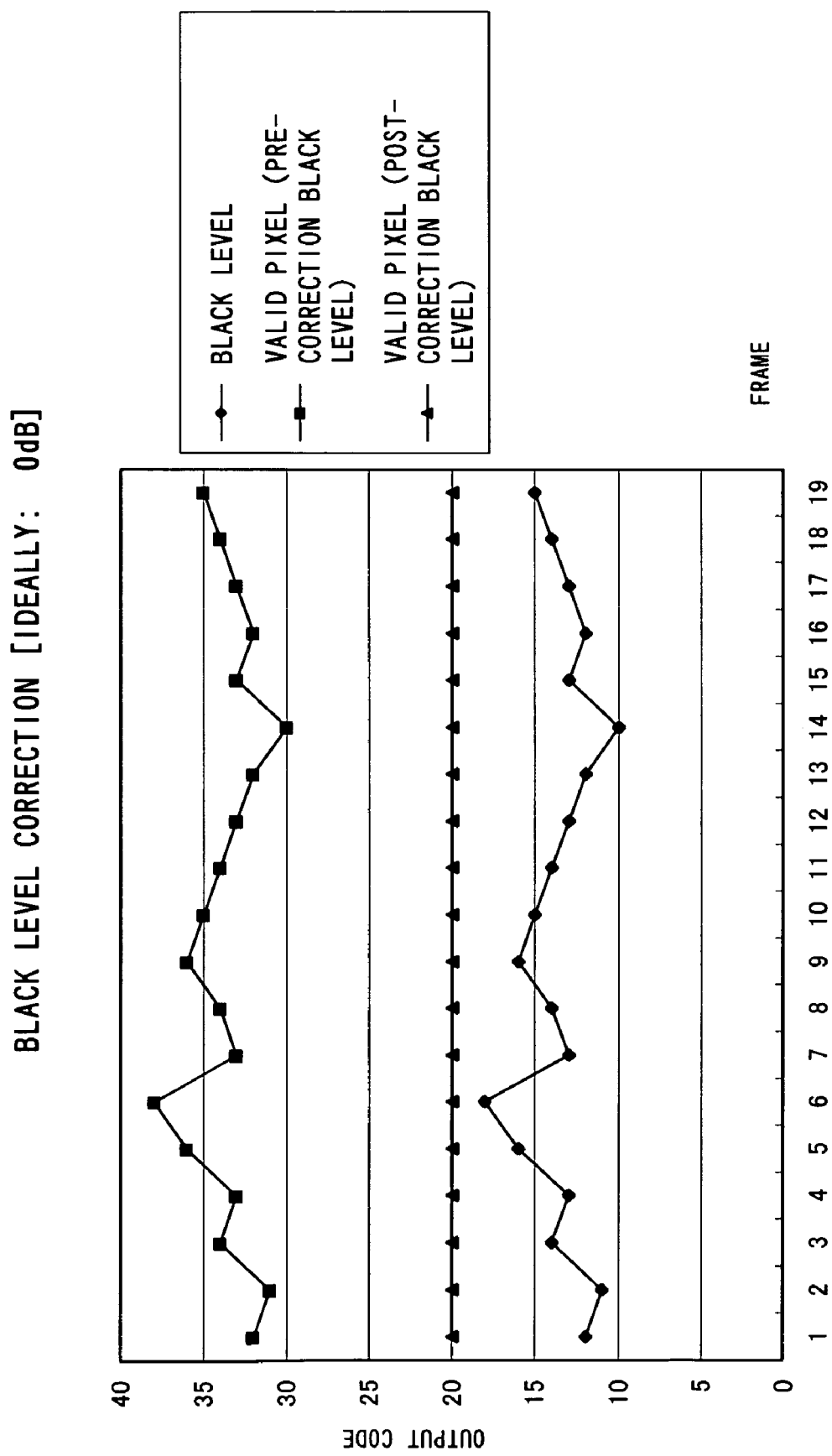
FIG. 3 shows a black level and an output code of a valid pixel.
Figure 4:
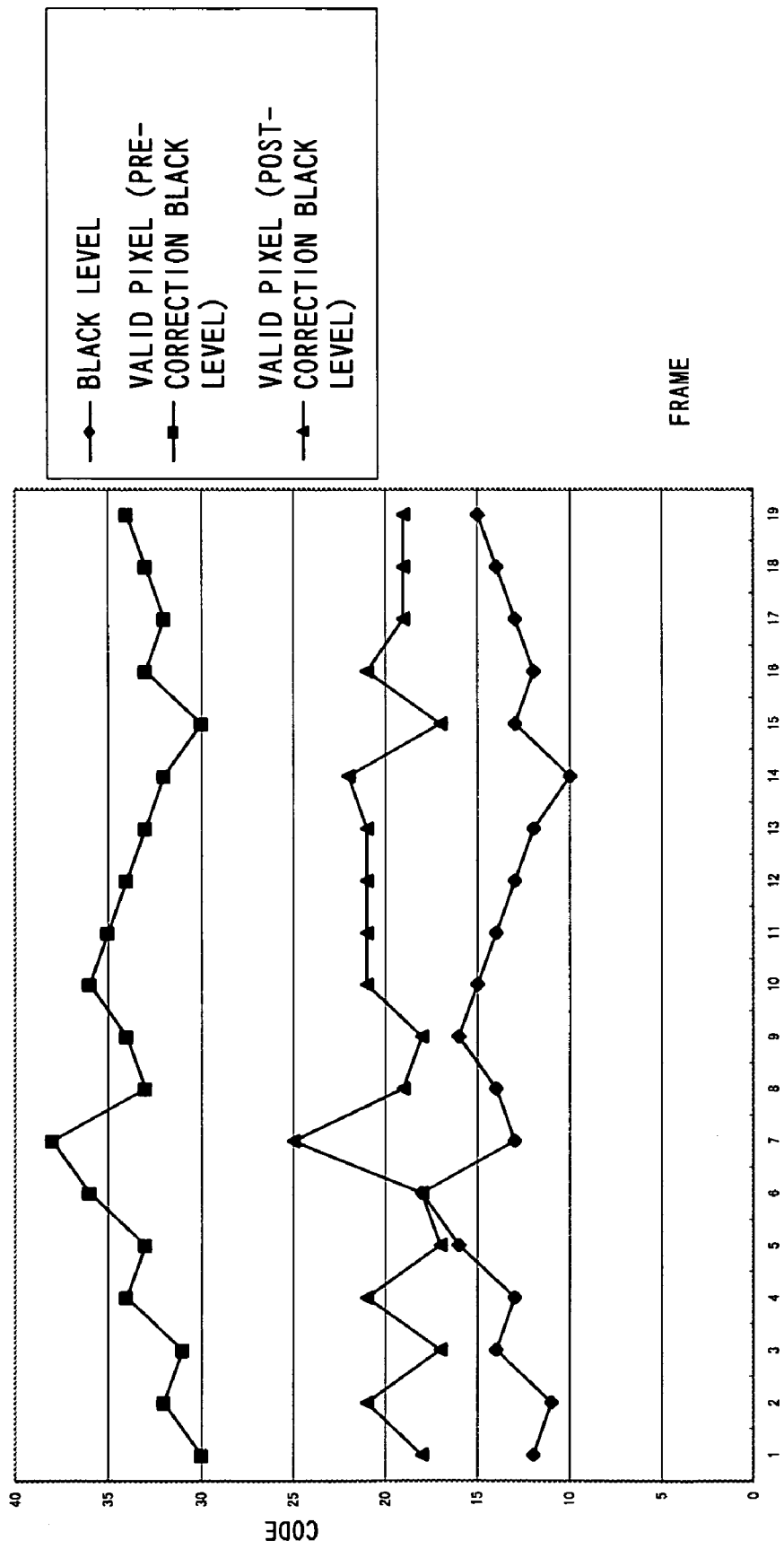
FIG. 4 shows a black level and an output code of a valid pixel.
Figure 5:
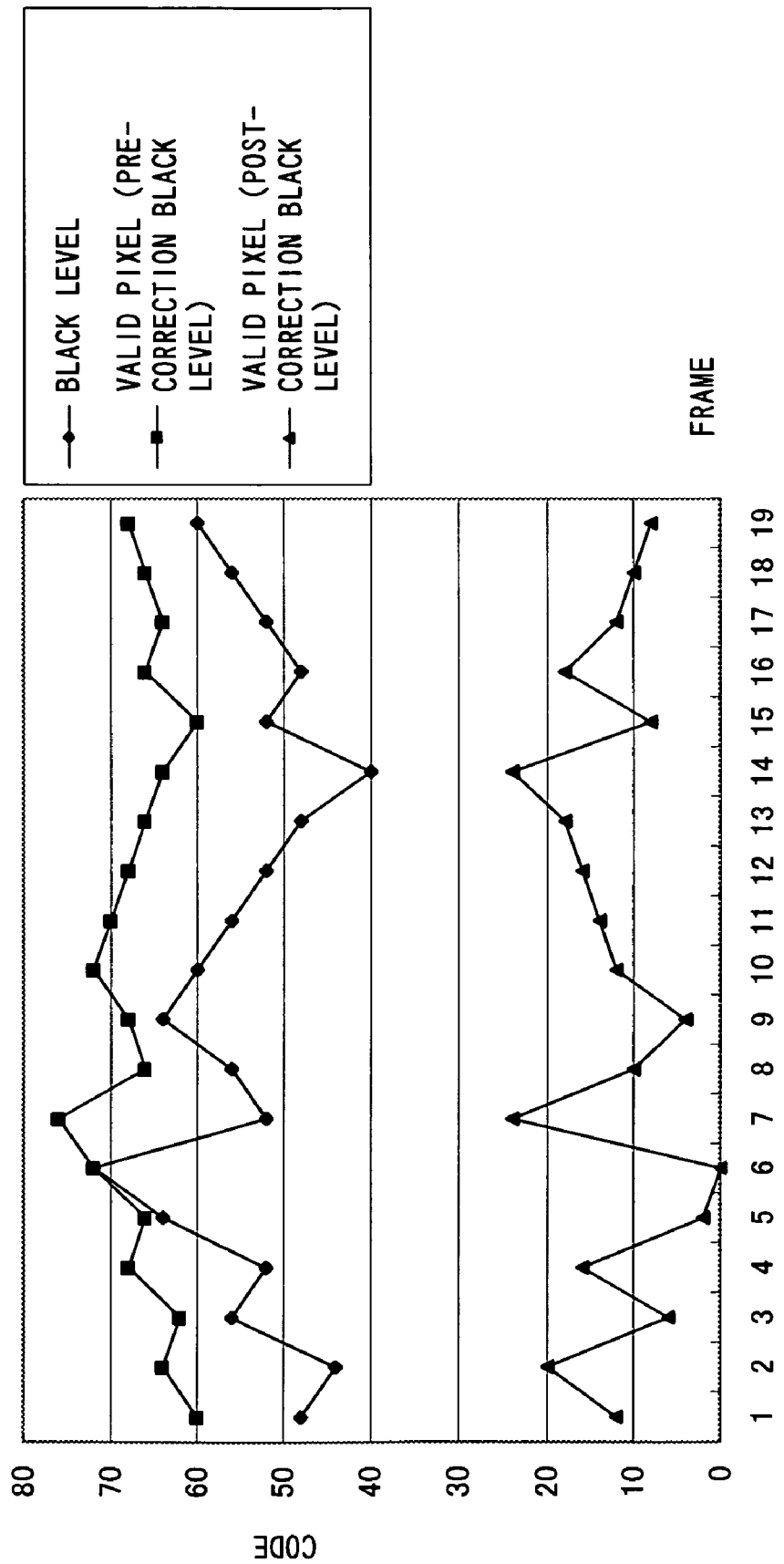
FIG. 5 shows a black level and an output code of a valid pixel in the case of using a variable gain amplifier.

A black level pixel value output from a shaded part from light 11a (simply a "shaded part 11a" hereinafter) of an image sensor 11 (refer to FIG. 1) is amplified by a variable gain amplifier 22 and converted to digital image data by an A/D converter 23. Meanwhile, a pixel value of a valid pixel output from an imaging part 11b of the image sensor 11 is amplified by a variable gain amplifier 24 and converted to digital valid image data by an A/D converter 25.

A register group 29 comprises a register 30 for storing the number of judgment frames (corresponding to a predetermined period), a register 31 for storing a multiplier value N for multiplying a black level average value of the current frame, a register 32 for storing a multiplier value M for multiplying a weighted average of the past frames, and a register 33 for storing a threshold value (i.e., a predefined value as reference for judging an amount of change in gains) for a judgment by a later described condition judgment circuit 34.

The number of judgment frames stored by the register 30 is defined as a frame for a reference used for judging whether or not a frame of an amount of change in gains of the variable gain amplifiers 22 and 24 being equal to or greater than a threshold value stored by the register 33 continues for a predetermined number of frames or more.

The value N stored by the register 31 is for weighting a black level value of the current frame, being set by N=1 according to the first embodiment. The value M stored by the register 32 is for weighting a weighted average of the past frames, being set by M=8 for multiplying black reference data according to the first embodiment.

The threshold value stored by the register 33 is a value as the reference for judging an amount of changes in gains of the variable gain amplifiers 22 and 24.

The black level correction circuit 26 comprises a black level reference calculation circuit 27 and a subtracter 28. The black level reference calculation circuit 27 further comprises a condition judgment circuit 34 and a black reference data calculation circuit 35.

The condition judgment circuit 34 retains the past gains of the variable gain amplifiers 22 and 24 for a frame to be judged by a number which is stored by the register 30, judges as to which condition it applies to by judging whether or not amounts of changes in gains of other frames vis-à-vis a gain of a specific frame is equal to or greater than a preset threshold value and output the judgment result to the black reference data calculation circuit 35.

The black reference data calculation circuit 35 comprises an average calculation circuit for calculating an average worth one line of a later described black level value, a weighted average calculation circuit for calculating a weighted average of an average of black levels and black reference data (i.e., a black level reference value) and a selection circuit for selecting black reference data according to a judgment result of the condition judgment circuit 34.

The subtracter 28 subtracts black reference data, which is output from the black level reference calculation circuit 27, from a value of valid pixels output from the A/D converter 25 and outputs data of the subtraction result to an automatic gain control circuit 36.

The automatic gain control circuit 36 comprises a brightness average value calculation part 37 for calculating an average of brightness of valid pixels after correcting a black level which is output from the black level correction circuit 26 and a gain calculation part 38 for calculating a gain according to the average value of brightness. The automatic gain control circuit 36 controls a gain of a variable gain amplifier variably by outputting the calculated gain to the variable gain amplifiers 22 and 24, and also outputs the aforementioned calculated gain to the black level correction circuit 26.

Figure 8:
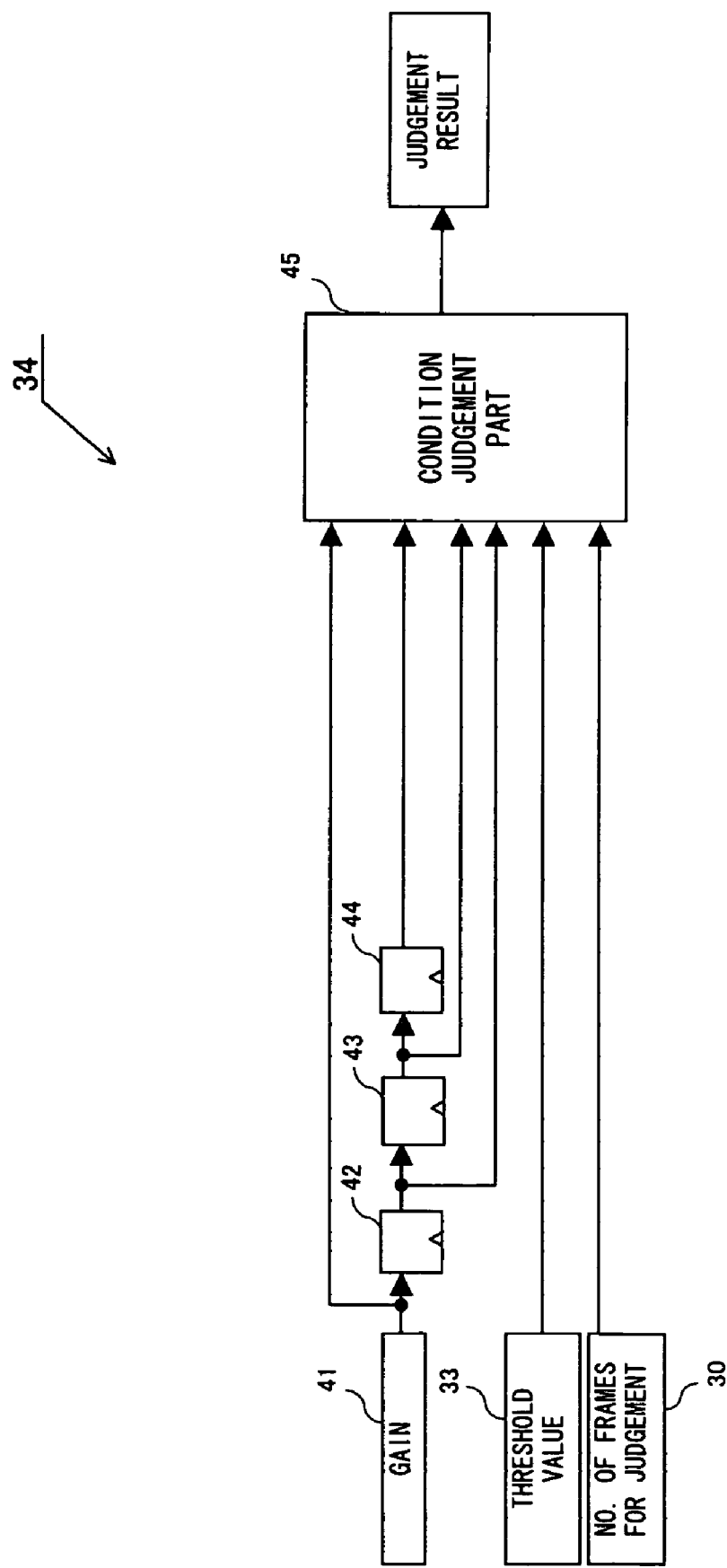
FIG. 8 is a circuit diagram of a condition judgment circuit according to the first embodiment.

Next up, FIG. 8 is a circuit diagram of the condition judgment circuit 34 which comprises a latch circuit 41 for retaining a gain of the current frame (that is called a gain a) output from the automatic gain control circuit 36, a latch circuit 42 for retaining a gain of the first previous frame (that is called a gain b), a latch circuit 43 for retaining a gain of the second previous frame (that is called a gain c), a latch circuit 44 for retaining a gain of the third previous frame (that is called a gain d) and a condition judgment part 45 for calculating an amount of change in gains from the gains latched by the aforementioned respective latch circuits, and outputting a selection signal for the purpose of selecting black reference data to the black reference data calculation circuit 35.

The condition judgment part 45 calculates the difference between the current gain and a gain of the third previous frame of the variable gain amplifiers 22 and 24, calculates the difference between a gain of the first previous frame and that of the third previous frame and calculates the difference between a gain of the second previous frame and that of the third previous frame. That is followed by judging whether an instantaneous change in gains or a constant change in gains by the fact that a frame of an amount of changes in the calculated gain being equal to or greater than a threshold value continues for a predefined number of frames, or more, existing or not. If the amount of change in the gains being equal to or greater than the threshold value continues for three frames or more, a selection signal is output to instruct a setup of an average of the black level data of the current frame being as new black reference data.

For example, in the case of a number of frames to be judged is "2" when the condition judgment circuit 34 judges an amount of change in a gain, a signal is output for making the average of the black level data of the current frame selected as new black reference data if the amount of change in gains (i.e., the absolute value of the gain a minus the gain c) which is a result of subtracting the gain of the second previous frame (i.e., the gain c) from the current gain (i.e., the gain a) is equal to or greater than a threshold value and also if an amount of change in gains (i.e., the absolute value of the gain b minus gain c) which is a result of subtracting the gain of the second previous frame (i.e., the gain c) from the first previous frame (i.e., the gain b) is equal to or greater than a threshold value.

And in the case of a number of frames to be judged being "L ($\geqq 3$)", judged are whether or not an amount of change in gains (i.e., the gain a minus the gain L plus 1) which is a result of subtracting the gain of the L plus one previous frame (i.e., the gain L+1) from the current gain (i.e., the gain a) is equal to or greater than a threshold value, an amount of change in gains (i.e., the gain b minus the gain L+1) which is a result of subtracting the gain of the L− previous frame from that of the first previous frame (i.e., the gainb) is equal to or greater than a threshold value, omitting frames in between, and an amount of change in gains (i.e., the gain L minus the gain L+1) which is a result of subtracting the gain of the L−previous frame (i.e., the gain L+1) from that of the L−1 previous frame (i.e., the gain L) is equal to or greater than a threshold value.

If the judgment result produces the fact that the amounts of changes in the gains of all the frames are equal to or greater than the threshold value, then a selection signal is output for making the average value of the current black level data selected as new black reference data. If a frame of an amount of change in the gains being equal to or greater than the threshold value is less than a number of frames to be judged, then a selection signal is output for making the current black reference data selected, in lieu of the black reference data being updated.

Figure 9:
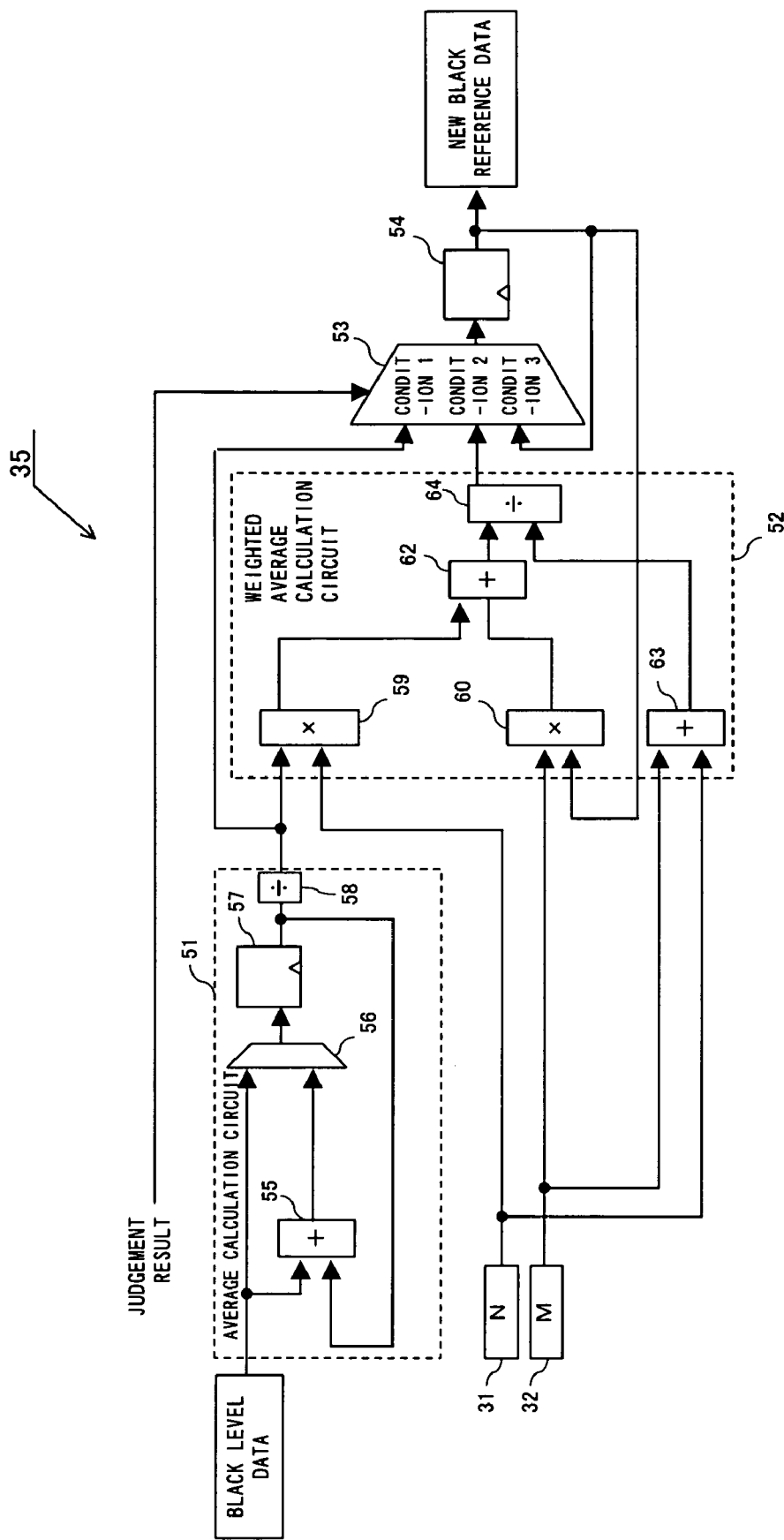
FIG. 9 is a circuit diagram of a black reference data calculation circuit.

Next, FIG. 9 is a circuit diagram exemplifying a black reference data calculation circuit 35 which comprises an average calculation circuit 51 for calculating the average of black reference data for one line, a weighted average calculation circuit 52 for calculating a weighted average value by weighting black level data of the current frame and the current black reference data, a selection circuit 53 for selecting either a condition one, condition two or condition three, and a latch circuit 54 for retaining an output of the selection circuit 53.

The average calculation circuit 51 comprises an adder 55 for adding black level data output from the A/D converter 23 to other black level data of the same line retained by a latch circuit 57, a selector 56 for selecting and outputting either black level data output from the A/D converter 23 or black level data output from the adder 55, the latch circuit 57 for retaining black level data output from the selector 56, and a divider 58 for calculating an average value by dividing a cumulative total value of the black level data retained by the latch circuit 57 by the number of data.

At the average calculation circuit 51, the initial value of black level data of one line is selected by the selector 56 followed by the latch circuit 57 latching it. Then, the first black level data latched by the latch circuit 57 and the second black level data output from the A/D converter 23 are added by the adder 55, followed by the selector 56 selecting the addition result and the latch circuit 57 latching it. Then, the cumulative total value of the first and second black level data latched by the latch circuit 57 and the third black level data are added by the adder 55, followed by the latch circuit 57 latching the cumulative total value of the addition result.

A repetition of the above described operation completes the calculation of the cumulative total value of the black level data for one line of the image sensor 11, followed by dividing the final cumulative total value by the number of data points for one line of the shaded part 11a to calculate the average of black level data for one line.

The weighted average calculation circuit 52 comprises a multiplication circuit 59 for multiplying an average value of black level data calculated at the average calculation circuit 51 by a weighting value N stored by the register 31, a multiplier 60 for multiplying new black reference data latched by the latch circuit 54 by a weighting value M stored by the register 32, an adder 62 for adding the multiplication result of the multiplication circuit 59 and that of the multiplier 60, an adder 63 for adding the weighing values N and M, and a divider 64 for dividing the addition result of the adder 62 by the "N+M".

In the weighted average calculation circuit 52, an average is calculated by dividing, by weighting values "N+M", a result of adding a value obtained by multiplying the average value of the black level date for one line by the weighting value N and that obtained by multiplying the black reference data by the weighting value M.

The selection circuit 53 selects either the average value (i.e., a condition one) of black level data for one line calculated by the average calculation circuit 51, the weighted average value (i.e., a condition two) of a multiplied value of the average value of black level data calculated at the weighted average calculation circuit 52 by the weighting value N and a multiplied value of the current black reference data by the weighting value M, or the current black reference data (i.e., a condition three) retained by the latch circuit 54 according to the above described judgment result of the condition judgment circuit 34 and outputs the selected value as new black reference data to the latch circuit 54.

Figure 10:
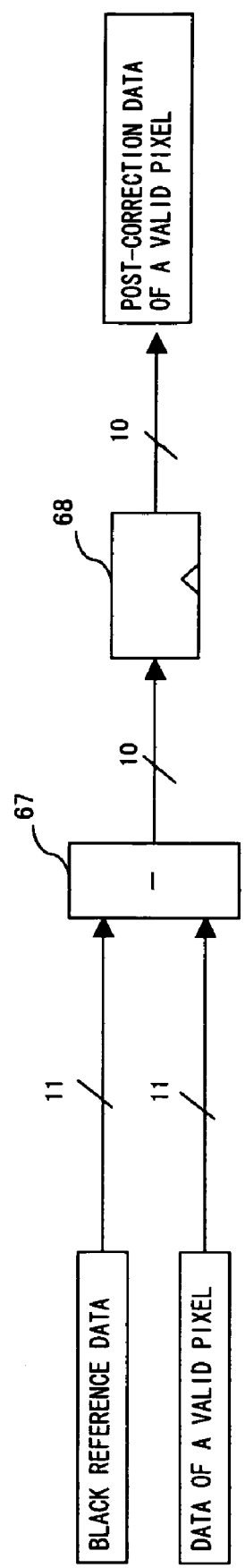
FIG. 10 describes data lengths of black reference data and data of a valid pixel.

FIG. 10 describes bit lengths of black reference data and data of a valid pixel.

Black reference data and data of a valid pixel respectively comprises 11-bit data which are respectively converted to 10-bit data of a valid pixel, and output, by a subtracter 67 which performs subtractions of the black reference data and data of a valid pixel. The output of the subtracter 67 is latched by a latch circuit 68 and the 10-bit data is output to the automatic gain control circuit 36 as post-correction data of a valid pixel.

Figure 11:
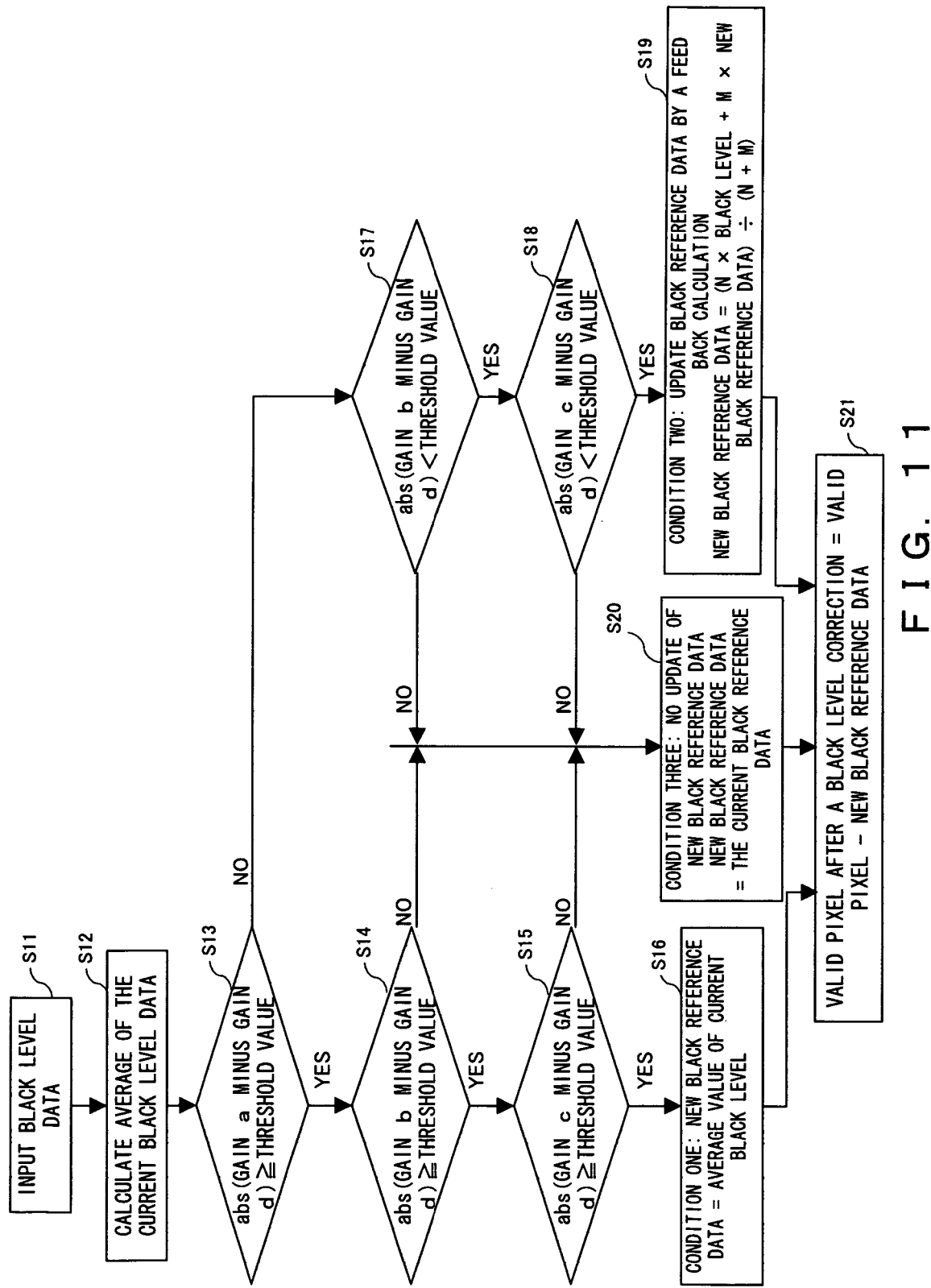
FIG. 11 is a flow chart showing an operation of a black level correction circuit.

Here, let it describe an operation of the above described black level correction circuit 26 by referring to the flow chart shown by FIG. 11.

First is to obtain black level data output from the A/D converter 23 (S11 shown in FIG. 11). Next is to calculate an average value of black level data for one line (S12). Next is to judge whether or not a gain difference is equal to or greater than a threshold value based on a number of frames to be judged. For example, in the case of the number of frames to be judged being "3", what is judged is whether or not an absolute value (abs) of the difference (i.e., a gain a minus gain d) between the current gain (i.e., the gain a) and gain of the third previous frame (i.e., the gain d) of the variable gain amplifiers 22 and 24 is equal to or greater than a threshold value, that is, whether or not an amount of change in gains of the current frame vis-à-vis a gain of the third previous frame is equal to or greater than the threshold value (S13).

If the amount of change in gains of the current frame is judged as being equal to or greater than the threshold value in the step S13 ("yes" for S13), proceed to the step S14 to judge whether or not the absolute value of the difference between a gain (i.e., a gain b) of the first previous frame and that of the third previous frame (i.e., the gain b minus the gain d) is equal to or greater than a threshold value, that is, whether or not the amount of change in gains of the first previous frame is equal to or greater than the threshold value.

If the step S14 judges that the amount of change in gains of the first previous frame is equal to or greater than the threshold value ("yes" for S14), proceed to the step S15 to judge whether or not the absolute value of the difference between a gain (i.e., a gain c) of the second previous frame and that of the third previous frame (i.e., the gain c minus the gain d) is equal to or greater than a threshold value, that is, whether or not the amount of change in gains of the second previous frame is equal to or greater than the threshold value.

If the step S15 judges that the amount of change in gains of the second previous frame is equal to or greater than the threshold value ("yes" for S15), proceed to the step S16 to set the average value of black level data of the current frame as new black reference data.

The above described processing makes it possible to set the average value of the current black level data as the black reference data if a frame of amount of change in gains of the variable gain amplifiers 22 and 24 being equal to or greater than a threshold value continues for three frames or more. This configuration makes it possible to have black reference value data converge at an appropriate value in a short time by setting an average value of the current black level data as the black reference data even in the case of calculating the black reference data by weighting the average value of the black level and black reference data.

Meanwhile, if the step S13 judges that the difference between the gain of the current variable gain amplifiers 22 and 24 and that of the third previous frame is smaller than the threshold value ("no" for S13), proceed to the step S17 to judge whether or not the absolute value of the difference in gains of the first previous frame and third previous frame is smaller than the threshold value, that is, whether or not an amount of change in gains of the first previous frame is smaller than the threshold value.

If the step S17 judges that the amount of change in gains of the first previous frame is smaller than the threshold value ("yes" for S17), proceed to the step S18 to judge whether or not the absolute value of the difference in gains of the second previous frame and third previous frame is smaller than a threshold value, that is, whether or not an amount of change in gains of the second previous frame is smaller than the threshold value.

If the step S18 judges that the amount of change in gains of the second previous frame is smaller than the threshold value ("yes" for S18), proceed to the step S19 to divide, by an "N+M", an added value of a value which is the result of multiplying the average value of the current black level by the N and value which is the result of multiplying the previous black reference data by the M, followed by setting the value obtained by the division as new black reference data.

As a result of the above described processing, if an amount of change in gains of the current frame, that of change in gains of the first previous frame and that of change in gains of the second previous frame are all smaller than a threshold value, then a value weighting the average value of the black level data of the current frame and black reference data is set as new black reference data.

Next, FIG. 12 shows a judgment result of the condition judgment circuit 34 by each number of frames to be judged.

FIG. 12 shows results of judging, with a threshold value of judgment reference for an amount of change in gains being "6", as "condition one" if a frame of an amount of change in gains being equal to or greater than a threshold value continues for the number of frames to be judged or more, as "condition two" if a frame of an amount of change in gains being equal to or greater than a threshold value does not exist and as "condition three" if a frame of an amount of change in gains being equal to or greater than a threshold value does not continue for the number of frames to be judged or more. Also shown here are the case of the number of frames to be judged are "1", "2" and "3".

Note that the "condition one" is defined as the case of selecting an average value of black level data of the current frame as new black reference data. The "condition two" is defined as the case of a value, which is an added value of a value multiplying the current black level data by a predetermined value N and a value multiplying black reference data by a predetermined value M, then divided by an "N+M" and selecting, and outputting, the division result value as black reference data. The "condition three" is defined as the case of selecting, and outputting, the previous black reference data in lieu of updating it.

Let it describe the case of a gain a of the current frame being "0", a gain b of the first previous frame being "0", a gain c of the second previous frame being "0", and a gain d of the third previous frame being "0" as shown by FIG. 12 (1).

In this case, amounts of changes in gains of the current frame, first previous frame, second previous frame are all smaller than the threshold value "6". Accordingly the judgment results are all "condition two."

Next, let it describe the case of a gain a of the current frame being "11" and gains b, c and d of the other frames being "0" as shown by FIG. 12 (2). In this case, the amount of change in gains of the gain a of the current frame with the gain d being the reference is "11" which is more than the threshold value "6".

In this case, when the number of frames to be judged is "1", the number of frames of an amount of change in gains being equal to or greater than the threshold value "6" is "1", satisfying a judgment condition for the number of frames and accordingly the judgment result of the condition judgment circuit 34 resulting in a "condition one".

When the number of frames to be judged is "2", the number of frames of an amount of change in gains being equal to or greater than the threshold value "6" is "1", falling short of the number of frames to be judged as "2", hence the judgment result in a "condition three".

Likewise when the number of frames to be judged is "3", the number of frames of an amount of change in gains being equal to or greater than the threshold value "6" falls short of the number of frames to be judged as "3", hence the judgment resulting in a "condition three".

Let it then describe the case of a gain a of the current frame being "13", a gain b of the first previous frame being "11", a gain c of the second previous frame being "11", and a gain d of the third previous frame being "0" as shown by FIG. 12 (3).

In this case, when the number of frames to be judged is "1", the difference in gains between the gain a of the current frame and gain b of the first previous frame is "1" and therefore the amount of change in gains is smaller than the threshold value "6", hence the judgment resulting in a "condition two".

When the number of frames to be judged is "2", the difference in gains between the gain a of the current frame and gain c of the second previous frame is "2", and the difference in gains between the gain b of the first previous frame and gain c of the second previous frame is "1" and therefore both of the amount of change in gains is smaller than the threshold value "6", hence the judgment resulting in a "condition two".

When the number of frames to be judged is "3", the difference in gains between the gain a of the current frame and gain d of the third previous frame is "13", the gain difference between the gain b and gain d is "12", the gain difference between the gain c and gain d is "11" and therefore the frames of the amount of change in gains being equal to or greater than the threshold value "6" continue for the three frames or more, hence the judgment resulting in a "condition one".

FIG. 13 shows another example of a condition judgment circuit, specifically showing a circuit diagram of a condition judgment circuit 71 with the number of frames to be judged being "2".

Referring to FIG. 13, a latch circuit 74 retains the gain a of the current frame, a latch circuit 73 retains a gain b of the first previous frame and a latch circuit 72 retains a gain c of the second previous frame.

An absolute value calculation circuit 75 calculates the absolute value of the difference between the gains a and c. The absolute value calculation circuit 75 comprises a comparator 77 for comparing a size relationship between the gains a and c, and a subtracter 78 for subtracting based on the comparison result of the comparator 77.

An absolute value calculation circuit 76 calculates the absolute value of the difference between the gains c and b. The absolute value calculation circuit 76 comprises a comparator 79 for comparing a size relationship between the gains c and b, and a subtracter 80 for subtracting based on the comparison result of the comparator 79.

The calculation result of the absolute value calculation circuit 75 is output to a comparator 81 in which the calculation result is compared with a threshold value output from the register 33.

Likewise, the calculation result of the absolute value calculation circuit 76 is output to the comparator 82 in which the calculation result is compared with a threshold value.

The comparison results of the comparators 81 and 82 are output to an AND circuit 83. The comparison result of the comparator 81 is inverted by an inverter 85 and also output to an AND circuit 84, and the comparison result of the comparator 82 is also inverted by an inverter 86 and output to the AND circuit 84.

The AND circuit 83 acquires the logic product of the comparison result of the comparator 81 and that of the comparator 82, and outputs a high level signal for indicating an establishment of a "condition one" if the mounts of changes in gains of the comparators 81 and 82 are judged as being equal to or greater than a threshold value, that is, the amounts of changes in gains are equal to or greater than the threshold value for consecutive two frames.

The AND circuit 84 acquires the logic product of the inverted output of the comparators 81 and 82, and outputs a high level signal for indicating an establishment of a "condition two" if both the gain a of the current frame and gain b of the first previous frame are smaller than a threshold.

The above described condition judgment circuit 71 is capable of judging whether the amounts of changes in gains of the variable gain amplifiers 22 and 24 are equal to or greater than a threshold value for two consecutive frames, whether they are smaller than the threshold value for two consecutive frames, or whether one frame is smaller than the threshold value; and generating a signal for determining whether to adopt the black level value of the current frame as black referenced at a or whether to calculate black reference data from a weighted value of the black level value of the current frame based on the judgment result.

A use of the above described condition judgment circuit 71 makes it possible to shorten a convergence time of black reference data by setting the current black level data as black reference data if an amount of change in gains becomes equal to or greater than a threshold value continues for two consecutive frames or more.

The above described first embodiment makes it possible to converge at black reference data appropriate for the current gain df the variable gain amplifier 22 in a short time by changing the black reference data to the black level value of the current frame if an amount of change in gains of the variable gain amplifier which amplifies the pixels value detected by an image sensor becomes equal to or greater than a threshold value continuously for a predefined period or more. And if the mount of change in gains does not reach at the threshold value, the black reference data is updated based on a weighted black level data and black reference data, thereby preventing a display quality from degrading, otherwise as a result of a variation of brightness of the image becoming large. Furthermore, even if an amount of change in gains is equal to or greater than a threshold value, black reference data is not updated if the amount of change in gains does not continue for a predefined period or more. This configuration prevents a display quality from being degraded if gains of the variable gain amplifiers 22 and 24 are changed by an instantaneous fluctuation of brightness of black as the subject of photographing, by which the black reference data is updated in link with the black level value leading to frequently changing the brightness of the image.

While the above described first embodiment is configured to calculate black reference data from a weighted average by weighting black level data and black reference data respectively, an alternative configuration may be to calculate the black reference data from the average of a plurality of previous frames for example, in lieu of being limited by the above described first embodiment.

Figure 14:
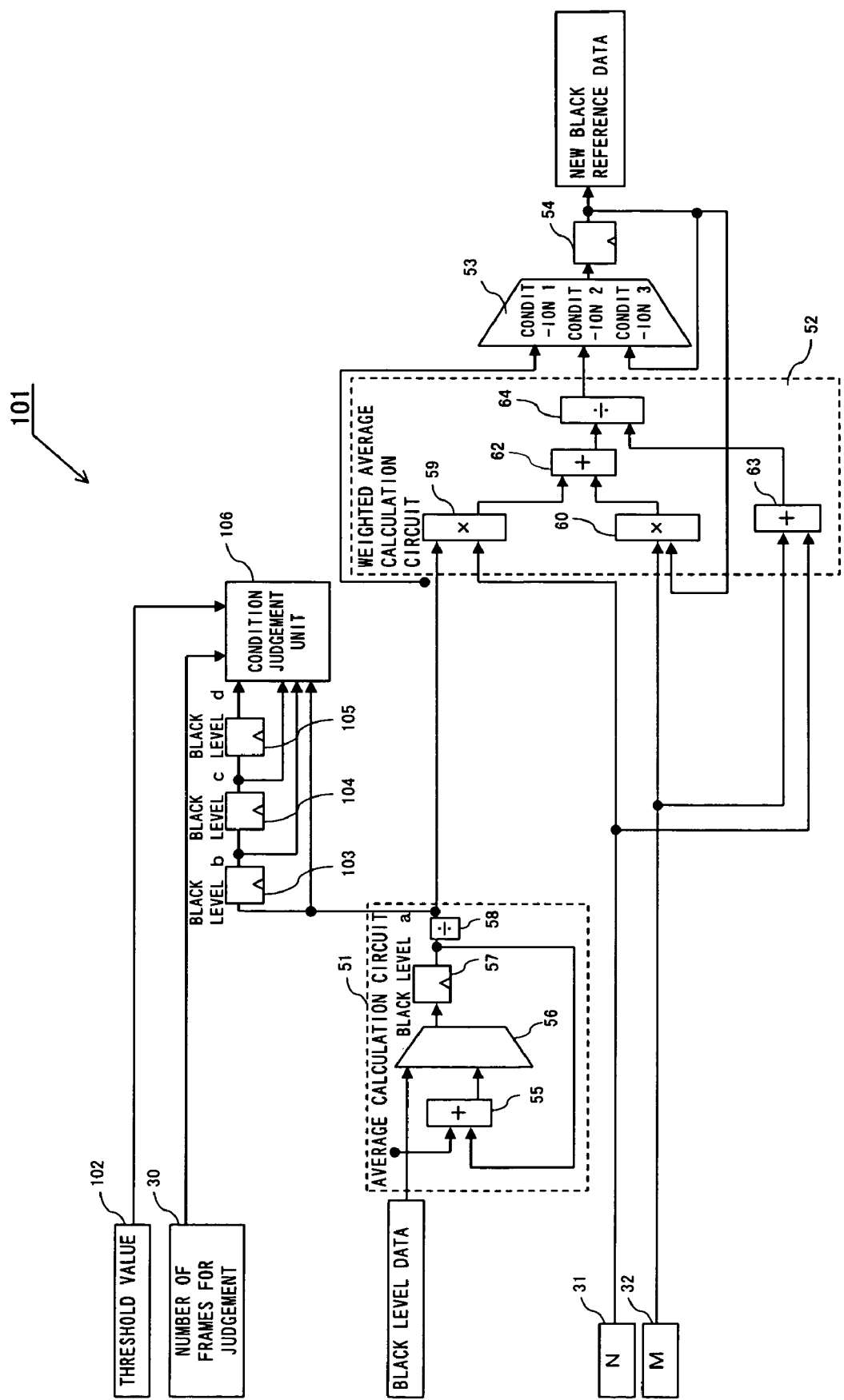
FIG. 14 is a circuit diagram of a black level correction circuit according to a second embodiment.

Next, FIG. 14 is a circuit block diagram of a black level correction circuit 101 according to a second embodiment of the present invention. Note that those components common to the circuit described for the first embodiment are designated by the same component reference signs and a duplicate description is omitted in the following descriptions.

The second embodiment is configured to judge whether or not a frame of an amount of change in gains of a black level value being equal to or greater than a predetermined value (i.e., a threshold value) continues for a predefined number of frames, and change black reference data to the black level value of the current frame if the aforementioned frame continues for the predefined number of frames or more.

Referring to FIG. 14, an average calculation circuit 51 (refer to FIG. 9) calculates the average value of black level data (simply called a "black level a" hereinafter) of the current frame which is detected by a shaded part 11*a* of an image sensor 11 and A/D converted.

The average value of the black level data calculated by the average calculation circuit 51 is output to a latch circuit 103 and a weighted average calculation circuit 52 (refer to FIG. 9).

The latch circuit 103 latches black level data output from the average calculation circuit 51 at a timing synchronized with a frame synchronous signal and outputs the latched black level data to a latch circuit 104. The output of the latch circuit 103 is also output to a condition judgment unit 106.

The latch circuit 104 latches an output of the latch circuit 103 at a timing synchronized with the frame synchronous signal and outputs the latched black level data to a latch circuit 105. The output of the latch circuit 104 is also output to the condition judgment unit 106.

The latch circuit 105 latches an output of the latch circuit 104 at the timing synchronized with a frame synchronous signal and outputs the latched black level data to the condition judgment unit 106.

The above described average calculation circuit 51 outputs the current black level data, the latch circuit 103 retains the black level data of the first previous frame, the latch circuit 104 retains that of the second previous frame and the latch circuit 105 retains that of the third previous frame.

The condition judgment unit 106 calculates the difference between the current black level data and the black level data of the third previous frame, the difference between the black level data of the first previous frame and that of the third previous frame and the difference between the black level data of the second previous frame and that of the third previous frame, followed by judging whether or not a frame of an amount of change in black level data being equal to or greater than a threshold value continues for a predefined number of frames (e.g., three frames).

If a frame of an amount of change in black level data being equal to or greater than a threshold value is judged to continue for three frames or more, the condition judgment unit 106 outputs a selection signal for a "condition one" to the selection circuit 53 (refer to FIG. 9). And, if a frame of an amount of change in black level data being equal to or greater than a threshold value is judged not to exist, the condition judgment unit 106 outputs a selection signal for a "condition three" to the selection circuit 53. Furthermore, if a frame of an amount of change in black level data being equal to or greater than a threshold value is judged to continue for one frame or more, and yet less than three, then the condition judgment unit 106 outputs a selection signal for a "condition two" to the selection circuit 53.

The selection circuit 53 selects and outputs the current black level data as new black reference data if it receives a selection signal for the "condition one" from the condition judgment unit 106. Or, the selection circuit 53 selects and outputs the weighted average data, which weights the current black level data and the black reference data for up to this event respectively, as new black reference data if it receives a selection signal for the "condition three". Furthermore, the selection circuit 53 selects and outputs the previous black reference data in lieu of updating black reference data if it receives a selection signal for the "condition two".

Figure 15:
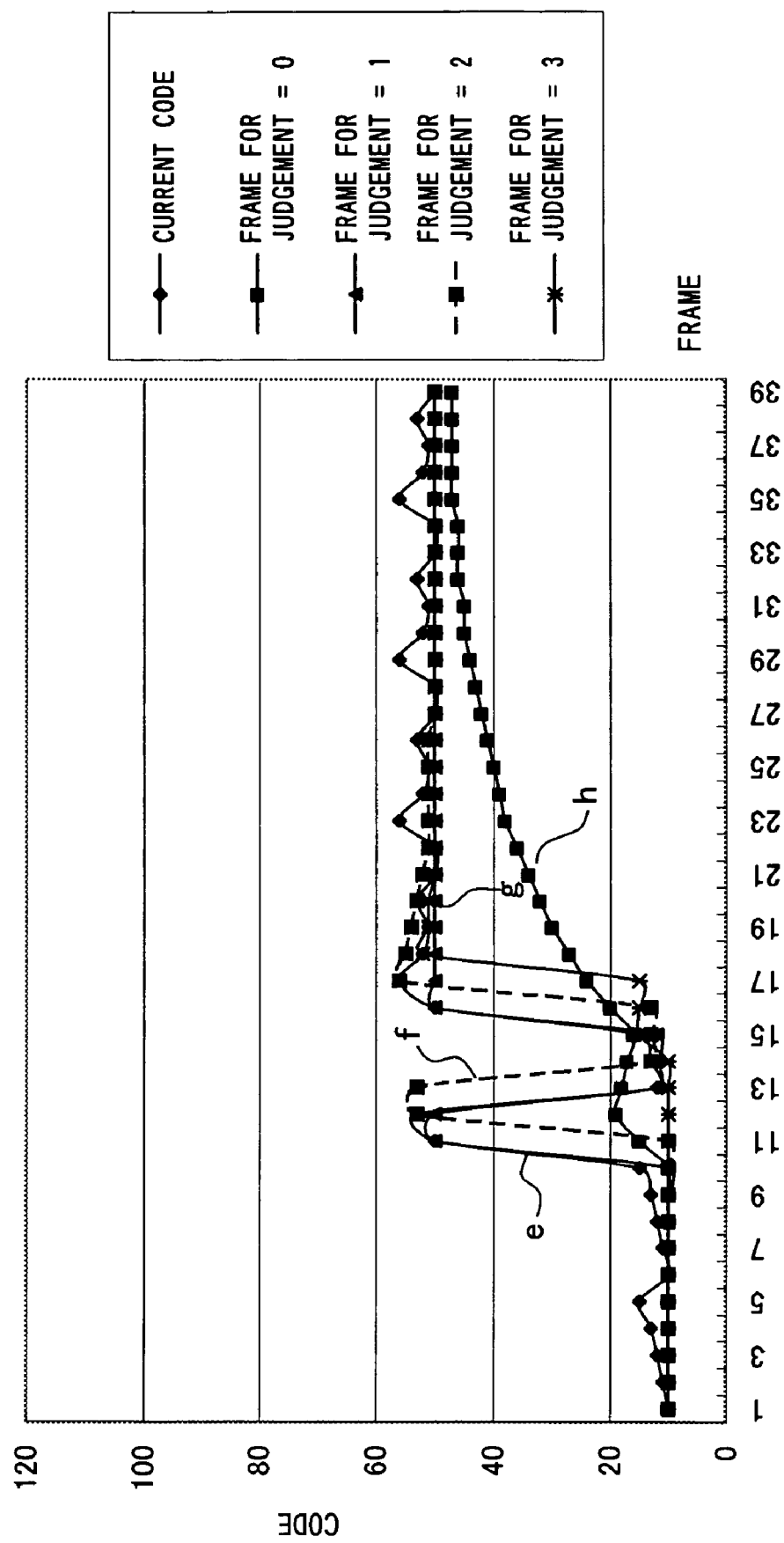
FIG. 15 shows a convergence characteristic of a black reference data.

Next, FIG. 15 shows a change of black reference data by the number of frames to be judged in the case of correcting a black level by the black level correction circuit 101 according to the second embodiment. FIG. 15 shows a converging speed of the black reference data by the number of frames to be judged.

This example has applied with weighting the current black level value and black reference data respectively, showing the case of "1" for the multiplier "N" to the current black level data, "7" for the multiplier "M" to the black reference data, and "10 (code value)" for the threshold value. In FIG. 15, the vertical axis shows the code values and the horizontal axis shows the frame numbers.

Referring to FIG. 15, the round black dots show codes of black level data, indicating that the code value of the number 10 frame is "15", the code value rapidly increases from the number 11 frame to "50", the next number 12 frame stays at approximately the same value and then the next number 13 frame rapidly decreases approximately to "10".

Applying the black level correction method according to the second embodiment to the above described black data when the number of frames to be judged is "1" and when the black level value becomes "50" at the number 11 frame, the amount of change in the black level value is "50 minus 15", hence the value exceeding the threshold value of "10" and accordingly black reference data is changed to "50" which is the current black level value. The next number 12 frame indicates the black level value at "50", hence the amount of change in the black level value being smaller than the threshold value of "10" and accordingly the previous black reference data (i.e., the immediate previous value "50" in this case) is used, in lieu of updating the black reference.

As the black level value changes to "10" in the next number 13 frame, the amount of change in the black level value exceeds the threshold value "10" and accordingly the black reference data is changed to "10" which is the black level value at this event.

As a result of the above, the black reference data changes by the unit of frame according to the blacklevel value as indicated by the curve e in FIG. 15.

Next description is on the case of the number of frames to be judged being "2". In this case, when the black level values become "50" continuously in the numbers 11 and 12 frames, thus the amount of change in the black level value exceeding the threshold value for two consecutive frames and accordingly the black reference data at this time is changed to the current black level value "50". Then, when the black level value changes to "10" in the next number 13 frame, the number of frame of the amount of change in black level being equal to or greater than the threshold value becomes "1" and accordingly the black reference data up to now is maintained (i.e., the immediate previous value "50" in this case).

Then, when the black level value becomes "10" in the next number 14 frame, the black level value of the current frame being "10", that of the first previous frame being "10" and that of the second previous frame being "50", and therefore the amount of change in the black level value becomes equal to or greater than the threshold value of "10" for two consecutive frames, hence changing the black reference data to "10" that is the current black level value.

The "x" dots on the dotted line f shown by FIG. 15 indicate a change of the value of the black reference data in the case of the number of frames to be judged being "2".

Next description is on the case of the number of frames to be judged being "3". In this case, the change in the black levels for the numbers 11 and 12 frames only continues for two frames, and therefore the black reference value is not updated.

Referring to FIG. 15, as the black level value becomes no less than "50" for continuous three frames at the number 16 frame and thereafter, the amount of change in the black level exceeds the threshold of "10" for three consecutive frames or more when the black level value becomes no less than "50" at the number 19 frame that is three frames after the number 16 frame at which the black level value rapidly changes at first, and accordingly a value of the black reference data is changed to "50" that is the black level value at this event.

As the black level value becomes no less than "50" at the number 19 frame and thereafter, the number of frames of the amount of change in the black level value being equal to or greater than the threshold value becomes smaller than "3" and therefore the previous black reference data (i.e., "50" in this case) is maintained, in lieu of updating it. Then, as all of the amount of change in the black level values for the current frame, first previous frame and second previous frame become smaller than the threshold value, then a weighted average value of a value which is the current black level value multiplied by N and a value which is the black reference data multiplied by M is calculated and the calculated value is set as the black reference data.

The "x" dots on the solid line curve g shown by FIG. 15 indicate a change of the value of the black reference data in the case of the number of frames to be judged being "3". When an amount of change in a black level value becomes equal to or greater than a threshold value for consecutive three frames, the black reference data is changed to the black level value at that event in the case of the number of frames to be judged being "3".

In the case of setting the number of frames to be judged at "3", if a change in a black level value is in a short period (i.e., a period of two frames or less), the previous black reference data is retained as understood from FIG. 15, thereby preventing a flicker in brightness of a photographed image otherwise as a result of the black reference data being changed by an instantaneous fluctuation of brightness in an image as the subject of photographing.

Furthermore, if a black level value continues for a predefined period or more, the black reference data is updated by the black level value at that event, and therefore it is possible to converge at an appropriate black reference value in the case of a gain of the variable amplifier changing in a short time.

The curve h shown by FIG. 15 indicates a convergence characteristic of black reference data in the case of the number of frames to be judged being "0" that is applicable to the conventional black level correction method in which a data weighting is applied even if a black level value changes drastically and therefore the black referenced at a changes merely gradually, resulting in taking a long time for the black reference data to converge at an appropriate value.

The above described second embodiment is configured to change black reference data to a black level value of the current frame if an amount of change in the black level value becomes a threshold value or greater for a continuous predefined period. And the previous black level reference value is retained, in lieu of updating it, if a period of the amount of change in the black level value being equal to or greater than the threshold value does not continue for a predefined period or more. Furthermore, the weighted average of values which are the black level value and black reference data respectively weighted is calculated and the calculated value is set as the black reference data if the amount of change in the black level is smaller than the threshold value for the predefined period continuously. The above described operation of the black level correction circuit 101 makes it possible to converge at appropriate black reference data according to a changed gain in short time when the gain is changed due to a fluctuation of the brightness of an image as the subject of photographing for example. Furthermore, if the amount of change in the black level value does not become equal to or greater than the threshold value for the predefined period continuously, the black reference data is not updated, and therefore it is possible to suppress a fluctuation of the brightness of an image by the unit of frame otherwise by updating the black reference data due to a temporary variation of gain, et cetera.

Note that a combined configuration of the first and second embodiments may be possible to calculate both an amount of change in gains and that in black level data, and perform a condition judgment based on these amounts thereof.

The above described embodiments are capable of suppressing a variation of brightness of an image detected by an image sensor and also converge at an appropriate black level reference value in a short time.

What is claimed is:

1. A semiconductor integrated apparatus comprising:
   a variable gain amplifier for amplifying a pixel value detected by an image sensor;
   a black level correction circuit for judging whether or not a period of an amount of change in gains of the variable gain amplifier being equal to or greater than a predetermined value continues for a predefined period or more, making a black level value of the image sensor which is output from the variable gain amplifier as a new black level reference value if a period of an amount of change in gains of the variable gain amplifier being equal to or greater than a predetermined value continues for a predefined period or more, correcting a black level of a valid pixel of the image sensor based on the black level reference value, or correcting a black level of the valid pixel based on the previous black level reference value in lieu of updating it if a period of an amount of change in gains of the variable gain amplifier being equal to or greater than a predetermined value does not continue for a predefined period or more; and
   an automatic gain control circuit for controlling a gain of the variable gain amplifier based on a value of a valid pixel which is corrected for a black level by the black level correction circuit, wherein
   said black level correction circuit comprises:
   a gain storage circuit for storing gains of said variable gain amplifier relating to plural frames of images detected by said image sensor;
   a judgment circuit for calculating amounts of changes in gains of other frames vis-à-vis a gain of a specific frame which is stored by the gain storage circuit to judge whether or not a frame of the amount of change in gains being equal to or greater than a predetermined value continues for a predefined number of frames or more; and
   a selection circuit for selecting a black level value output from the variable gain amplifier as new black level reference value if the judgment circuit judges that a frame of an amount of change in gains being equal to or greater than a predetermined value continues for a predefined number of frames or more, selecting a calculated value from a black level value output from the variable gain amplifier and a black level reference value as new black level reference value if the judgment circuit judges that a frame of an amount of change in gains being equal to or greater than a predetermined value does not exist, or selecting the previous black level reference value in lieu of updating it if the judgment circuit judges that an amount of change in gains is equal to or greater than a predetermined value and that a frame of an amount of change in gains being equal to or greater than a predetermined value does not continue for a predefined number of frames or more.

2. The semiconductor integrated apparatus, comprising:
   a variable gain amplifier for amplifying a pixel value detected by an image sensor;
   a black level correction circuit for judging whether or not a period of an amount of change in gains of the variable gain amplifier being equal to or greater than a predetermined value continues for a predefined period or more, making a black level value of the image sensor which is output from the variable gain amplifier as a new black level reference value if a period of an amount of change in gains of the variable gain amplifier being equal to or greater than a predetermined value continues for a predefined period or more, correcting a black level of a valid pixel of the image sensor based on the black level reference value, or correcting a black level of the valid pixel based on the previous black level reference value in lieu of updating it if a period of an amount of change in gains of the variable gain amplifier being equal to or greater than a predetermined value does not continue for a predefined period or more; and an automatic gain control circuit for controlling a gain of the variable gain amplifier based on a value of a valid pixel which is corrected for a black level by the black level correction circuit, wherein
   said black level correction circuit at least comprises a first gain storage circuit for storing a gain of said variable gain amplifier of the current frame, a second gain storage circuit for storing a gain of a first previous frame, a third gain storage circuit for storing a gain of a second previous frame, a fourth gain storage circuit for storing a gain of a third previous frame, and a judgment circuit for calculating an amount of change in gains of other frames vis-à-vis a specific frame stored by the first through fourth gain storage circuits and judging whether or not a frame of the amount of change in gains being equal to or greater than a predetermined value continues for a predefined number of frames.

3. A semiconductor integrated apparatus, comprising:
   a variable gain amplifier for amplifying a pixel value detected by an image sensor;
   a black level correction circuit for judging whether or not a period of an amount of change in gains of the variable gain amplifier being equal to or greater than a predetermined value continues for a predefined period or more, making a black level value of the image sensor which is output from the variable gain amplifier as a new black level reference value if a period of an amount of change in gains of the variable pain amplifier being equal to or greater than a predetermined value continues for a predefined period or more, correcting a black level of a valid pixel of the image sensor based on the black level reference value, or correcting a black level of the valid pixel based on the previous black level reference value in lieu of updating it if a period of an amount of change in gains of the variable gain amplifier being equal to or greater than a predetermined value does not continue for a predefined period or more; and an automatic gain control circuit for controlling a gain of the variable gain amplifier based on a value of a valid pixel which is corrected for a black level by the black level correction circuit, wherein said variable gain amplifier comprises a first variable gain amplifier for amplifying a black level value output from a shaded pixel, from light, of said image sensor, and a second variable gain amplifier for amplifying a value of a valid pixel of the image sensor; and said black level correction circuit at least comprises a gain storage circuit for storing gains of the first and second variable gain amplifiers relating to the current, a first previous frame, a second previous frame and a third previous frame, and a judgment circuit for calculating amounts of changes in gains of other frames vis-à-vis a specific frame stored by the gain storage circuit and judging whether or not a frame of the amount of change in gains being equal to or greater than a predetermined value continues for a predefined number of frames or more.

* * * * *